United States Patent [19]

Moriga et al.

[11] 3,988,292
[45] Oct. 26, 1976

[54] GAS-FADE INHIBITOR AND ANTI-GAS-FADE POLYMER COMPOSITION

[75] Inventors: Hiroyuki Moriga, Takatsuki; Tadao Morishita, Kobe; Toshihiko Shinoda; Isamu Takahashi, both of Iwakuni, all of Japan

[73] Assignee: Teijin Limited, Osaka, Japan

[22] Filed: June 10, 1975

[21] Appl. No.: 585,591

Related U.S. Application Data

[62] Division of Ser. No. 334,202, Feb. 21, 1973, abandoned.

[30] Foreign Application Priority Data

Feb. 24, 1972  Japan................................ 47-19054

[52] U.S. Cl. ........................ 260/45.8 NT; 106/176; 260/249.5; 260/249.6; 260/249.8
[51] Int. Cl.² ........................................... C08K 5/34
[58] Field of Search .............. 260/45.8 NT; 106/176

[56] References Cited
UNITED STATES PATENTS

| | | |
|---|---|---|
| 3,255,191 | 6/1966 | Dexter et al. ....................... 260/248 |
| 3,778,409 | 12/1973 | Oertel et al. ....................... 260/45.8 |
| 3,894,019 | 7/1975 | Westlinning et al. ............. 260/249.5 |
| 3,929,726 | 12/1975 | Schollenberger et al. ........ 260/45.85 |

*Primary Examiner*—Donald E. Czaja
*Assistant Examiner*—R. A. White
*Attorney, Agent, or Firm*—Sherman & Shalloway

[57] ABSTRACT

A gasfade inhibitor for polyurethanes and cellulose acetates, said inhibitor comprising a triazine derivative expressed by the following formula

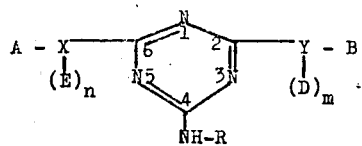

wherein the symbols are defined as in the claim, and an anti-gas-fade polymer composition containing the same.

19 Claims, No Drawings

GAS-FADE INHIBITOR AND ANTI-GAS-FADE POLYMER COMPOSITION

This is a division, of application Ser. No. 334,202, filed Feb. 21, 1973, now abandoned.

This invention relates to a gas-fade inhibitor capable of imparting a durable, superior gas-fade inhibiting effect to polyurethanes and cellulose acetates without adversely affecting the desirable properties of these polymers, and to an anti-gas-fade polymer composition comprising a polyurethane or a cellulose acetate and said inhibitor incorporated therein.

More specifically, this invention relates to a gas-fade inhibitor for polyurethanes and cellulose acetates, said inhibitor comprising a triazine derivative expressed by the formula

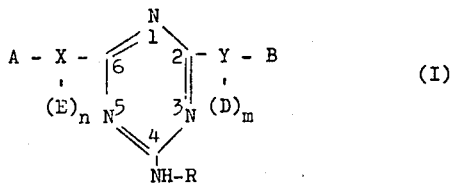

wherein X and Y are the same or different and each represent a member selected from the group consisting of —N<, —S— and —C—, when X is —N<, $n$ is 1, when X is —S— or —O—, $n$ is zero, when Y is —N<, $m$ is 1, and when Y is —S— or —O—, $m$ is zero; each of A, B and R is a member selected from the group consisting of alkyl groups having 1 to 18 carbon atoms, alkenyl groups having 3 to 18 carbon atoms, cycloalkyl groups having 3 to 6 carbon atoms, a benzyl group, substituted benzyl groups, cyanoalkyl groups having 3 to 5 carbon atoms dialkylamino groups having 2 to 8 carbon atoms, a phenylamino group, a phenyl group, and substituted phenyl groups, with the proviso that A, B and R do not represent a phenyl group or substituted phenyl group at the same time, and that when each of X and Y is —S— or —O—, R is not a phenyl group or substituted phenyl group; each of D and E is a member selected from the group consisting of a hydrogen atom and the same groups as represented by A, B and R, A and E or B and D may together form a heterocyclic ring containing 2 to 5 carbon atoms together with X and Y, when both of E and D are groups other than a hydrogen atom, R is not a phenyl group or substituted phenyl group, when only E is a hydrogen atom, both A and R are not phenyl groups or substituted phenyl groups, and when only D is a hydrogen atom, both B and R are not phenyl groups or substituted phenyl groups; and the sum of carbon atoms contained in A, B, D, E and R is at least 10. It also relates to an anti-gas-fade polymer composition comprising a polymer selected from the group consisting of polyurethanes and cellulose acetates and not more than 10 percent by weight, based on said polymer, of the triazine derivative defined above.

Increased concentrations of a mono-oxide of nitrogen present in air (to be referred to as nitrogen oxide gas) have posed a problem of air pollution. In recent years, it has been noted that nitrogen oxide gas causes gradual yellowing of polyurethanes or deteriorates their physical properties, or causes the discoloration or fading of the dyeings of polyurethanes or cellulose acetates. This phenomenon is referred to as "gas-fading."

The gas-fade inhibitor of this invention makes it possible to prevent the undesirable "gas-fade" phenomenon caused by nitrogen oxide gas present in air.

Some of the compounds expressed by formula (1) given above have already been known as active ingredients of agricultural and horticultural fungicides or bactericides. Some others are known as active ingredients of herbicides, and still others are known as agents for improving the dyeability of polyolefins. However, it has never been proposed to apply the triazine derivatives of formula (1) defined above to polyurethanes and cellulose acetates which have extremely different chemical structures as those of the polyolefins. Furthermore, the inhibition of the "gas-fade" phenomenon does not present any subject of study in the polyolefins, and the excellent gas-fade inhibition effects of the compounds of formula (1) on polyurethanes and cellulose acetates were quite unexpected.

Various inhibitors have previously been proposed for inhibiting the gas-fade phenomenon of polyurethanes or cellulose acetates caused by nitrogen oxide gas, but none of them have ever been able to have good affinity with these polymers and produce a durable, superior gas-fade inhibiting effect without adversely affecting the desirable properties of these polymers.

For example, in an attempt to inhibit the yellowing or fading of polyurethanes by nitrogen oxide gas, there have been used a high fatty acid such as stearic acid or behenic acid (Japanese Pat. Publication No. 22626/69), a higher alcohol such as n-decyl alcohol or stearyl alcohol (Japanese Pat. Publication No. 31804/69), a sulfur-containing higher fatty acid ester such as lauryl thioethyl alcohol, dilauryl thiodipropionate or distearyl thiodipropionate (Japanese Pat. Publication No. 25909/69), a higher fatty acid amide such as stearamide or palmitamide (Japanese Pat. Publication No. 27874/69), a urea such as phenylurea or phenylthiourea (Japanese Pat. Publication No. 19190/67), adipic acid dihydrazide and 2,4-bis-hydrazino-6-dimethylamino-s-triazine (Japanese Pat. Publication No. 25828/68), a hydrazide such as adipic acid-bis-N,N-dimethyl hydrazide (Japanese Pat. Publication No. 27348/65), a semicarbazide such as 1,1-dimethylstearyl-semicarbazide (Japanese Pat. Publication No. 16793/66), a phosphite ester such as tridecyl phosphite or trilauryl thiophosphite either alone or in combination with 2,4,6-tris-ethyleneimino-s-triazine or 2-phenyl-4,6-diamino-s-triazine (Japanese Pat. Publication Nos. 9828/69, 29672/68, and 28625/68), a hydroxyphenyl compound such as 1,3,5-trimethyl-2,4,6tris-(3,5-ditert-butyl-4-hydroxybenzyl) benzene (Japanese Pat. Publication No. 16856/68), and a polymeric compound such as poly(di-isopropylaminoethyl methacrylate) or poly (diethylaminoethyl methacrylate) (Japanese Pat. Publication No. 2904/71). All of these compounds have the above defects, and none of them are satisfactory as gas-fade inhibitors for polyurethanes.

On the other hand, in order to inhibit the discoloration or fading of cellulose acetates, especially the dyeings of these, there have been used primary, secondary or tertiary amines, hydroxylamines such as triethanolamine, heterocyclic compounds such as phenyl morpholine, 1,4-dibenzyl morpholine or N,N'-diphenyl piperazine, and compounds such as thiourea, melamine, N-acetyl melamine, N-phenyl melamine, 2,4-bis-anilino-6-amino-s-triazine or triphenylmelamine. However, these inhibitors for cellulose acetates are generally water-soluble, have low affinity for fibers, and in most cases reduce the wet fastness of the dyeings or the light resistance of the dyeings. Thus, up to the present, there has been hardly any inhibitor which has practical value. Furthermore, melamines an $-NH_2$ group are generally difficult to dissolve in an organic solvent such as acetone or methylene dichloride, and also have strong affinity for water. Accordingly, they cannot be mixed with the polymer before fabrication, and even when used for post-treatment, they cannot bring about an increase in durability.

When these gas-fade inhibitors for cellulose acetates are used for polyurethanes, they have poor durability and compatibility, and some of them undergo undesirable reactions with isocyanates or do not at all produce gas-fade inhibiting effects (especially, the tertiary amines). Some others reduce the light resistance of the polymer and deteriorate the physical properties of the fabricated polymer.

Tetrakis-[methylene-3-(3',5'-ditert-butyl-4'-hydroxyphenyl) propionate] methane (Irganox 1010, trademark, Ciba Geigy) well known as an antioxidant or 2-(2'-hydroxy-3',5'-diisoamylphenyl) benzotriazole (Tinuviu-328, trademark Ciba-Geigy) known as an ultraviolet absorbant is generally well used for polyurethanes, but these compounds have no gas-fade inhibiting effects or rather contribute to the gas-fade phenomenon. Furthermore, antioxidants of the triazine type such as 6-(4'-hydroxy-3',5'-ditert-butylanilino)-2,4-bis-octadecylthio-1,3,5-triazine (Irganox 565, trademark Ciba-Geigy) have no inhibiting effects on gas-fade.

The higher fatty acids, higher alcohols, higher fatty acid amides and higher fatty acid esters which have been given above are not believed, in view of their chemical structure, to have positive effects of preventing the yellowing or fading of polyurethanes by nitrogen oxide gas. However, as will be shown in the Examples later on, they apparently have an inhibiting action when incorporated in a polyurethane and fabricated into a film. This is probably due to the fact that these compounds bleed out on the surface of the film because of the poor compatibility with the polyurethane and thus shut off the polymer from the outside atmosphere. However, when such a compound is incorporated into a polyurethane, and the polymer is spun into filaments, or goes through dyeing, such as effect is not observed. Furthermore, these compounds prove quite ineffective for cellulose acetates.

It has now been found that the triazine derivatives expressed by formula (1) can impart a durable and superior gas-fade inhibiting effect to polyurethanes and cellulose acetates without adversely affecting the desirable physical properties of these polymers. It has also been found that the triazine derivative of formula (I) can be incorporated at any time from the preparation of polyurethanes to the final finishing of the shaped articles of the polyurethanes, for example, before, during or after the preparation of polyurethanes, or during or after the shaping of the polyurethanes, or during or after the dyeing of the shaped articles. We have also found that these triazine derivatives have excellent gas-fade inhibiting actions on these polymers, and good affinity for these polymers, that a wide variety of means can be employed for incorporating these inhibitors into the polymers, and that the improved properties can be maintained with durability.

Accordingly, it is an object of this invention to provide a gas-fade inhibitor for polyurethanes and cellulose acetates which can give a durable excellent gas-fade inhibiting effect and can be incorporated into these polymers by any desired means at any desired time.

Another object of this invention is to provide an anti-gas-fade polymer composition comprising a polyurethane or cellulose acetate and such an inhibitor incorporated therein.

Many other objects and advantages of this invention will become apparent from the following description.

The gas-fade inhibitor of this invention comprises the triazine derivative of formula (I), and contains at least one $-NH-$ group, preferably 2, more preferably 3 or more, $-NH-$ groups, in its molecule. Analogous triazine derivatives not containing an $-NH-$ linkage, such as 2,4,6-tris-dibutylamino-s-triazine, 2,4,6tris-morpholino-s-triazine, 2,4,6-tris-diallylamino-s-triazine or 2-diethylamino-4-dipropylamino-6-dibutylamino-s-triazine can hardly achieve gas-fade inhibiting effects in accordance with the present invention.

In formula (I), X and Y are the same or different and a member selected from the group consisting of $-N<$, $-S-$, and $-O-$. As is clear from formula (I), when X is $-N<$, $n$ is 1, when X is $-S-$ or $-O-$, $n$ is zero, when Y is $-N<$, $m$ is 1, and when Y is $-S-$ or $-O-$, $m$ is zero.

In formula (I), A, B and R are a member selected from the groups mentioned above. Examples of the substituents of the substituted benzyl groups represented by A, B and R in formula (I) are a chlorine atom and a methyl group and examples of the substituents of the substituted phenyl groups represented by A, B and R are halogen atoms such as chlorine or bromine, methyl, ethyl, nitro, methoxy and ethoxy groups.

Each of D and E is a member selected from the group consisting of a hydrogen atom and the same groups as represented by A, B and R, and A and E or B and D may form a heterocyclic ring containing 2 to 5 carbon atoms together with X and Y. As previously stated, the following restrictions are imposed on the compounds of formula (I).

a. A, B and R should not be a phenyl group or substituted phenyl groups at the same time.

b. When X and Y are a member selected from $-S-$ and $-O-$ (that is, when both X and Y are $-S-$ or $-O-$, X is $-S-$ and Y is $-O-$, or X is $-O-$ and Y is $-S-$) R should not be a phenyl group or substituted phenyl groups.

c. When both E and D are groups other than a hydrogen atom, R should not be a phenyl group or substituted phenyl groups.

d. When only E is a hydrogen atom (at which time D is a group other than a hydrogen atom), A and R should not be a phenyl group or substituted phenyl groups at the same time.

e. When only D is a hydrogen atom (at which time E is a group other than a hydrogen atom), B and R should not be a phenyl group or substituted phenyl groups at the same time.

f. The sum of the number of carbon atoms of A, B, D, E and R is at least 10. (usually, 10–50, preferably 12–40, more preferably 14–30).

Examples of compounds which do not satisfy the above restrictions are as follows:

Compounds which do not satisfy restriction (a):

2,4,6-tris-phenylamino-s-triazine, 2,4,6-tris-(p-anisidino)-s-triazine, and 2,4,6-tris-(o-anisidino)-s-triazine.

Compounds which do not satisfy restriction (b):
2,6-bis-phenoxy-4-phenylamino-s-triazine, and 2,6-bis-phenylthio-4-phenylamino-s-triazine.

Compounds which do not satisfy restriction (c):
2,6-bis-dibutylamino-4-phenylamino-s-triazine, 2,6-bis-morpholino-4-phenylamino-s-triazine, 2,6-bis-ethylene-imino-4-phenylamino-s-triazine, 2,6-bis-dibenzylamino-4-(o-anisidino)-s-triazine, and 2,6-bis-diallylamino-4-(p-chlorophenylamino)-s-triazine.

Compounds which do not satisfy restrictions (d) or (e):
2,4-bis-phenylamino-6-dibutylamino-s-triazine, 2,4-bis-(p-chlorophenylamino)-6-diallylamino-s-triazine, 2,4-bis-(p-toluidino)-6-morpholino-s-triazine, and 2,4-bis-phenylamino-6-piperidino-s-triazine.

Compounds which do not satisfy restriction (f):
2,4,6-tris-methylamino-s-triazine, 2,4,6-tris-ethylamino-s-triazine, 2,4-bis-methylamino-6-butoxy-s-triazine, 2,4-bis-ethylamino-6-methoxy-s-triazine, 2,4-bis-allyl-amino-6-methoxy-s-triazine, 2,4-bis-propylamino-6-methylthio-s-triazine, and 2-methylamino-4-propylamino-6-methylthio-s-triazine.

The above compounds, which are only a few examples, do not show outstanding effects as the gas-fade inhibitor of this invention does, or do not at all show such effects. Especially, the compounds which do not satisfy restriction (f)(having the low molecular weights) are extremely poor in durability.

Of the compounds expressed by formula (I), those expressed by formula (I)-a below are preferred

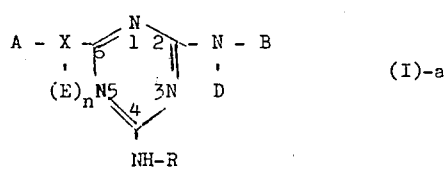

(I)-a wherein X is a member selected from the group consisting of —N<, —S—, and —C—, when X is —N<, n is 1 and when X is —S— or —O—, n is zero; each of A, B and R is a member selected from the group consisting of alkyl groups having 1 to 18 carbon atoms, alkenyl groups having 3 to 18 carbon atoms, cycloalkyl groups having 3 to 6 carbon atoms, a benzyl group, substituted benzyl groups, cyanoalkyl groups having 3 to 5 carbon atoms dialkylamino groups having 2 to 8 carbon atoms, a phenylamino group, a phenyl group, and substituted phenyl groups, with the proviso that A, B and R do not represent a phenyl group or substituted phenyl group at the same time; each of D and E is a member selected from the group consisting of a hydrogen atom and the same groups as represented by A, B and R, A and E or B and D may together form a heterocyclic ring containing 2 to 5 carbon atoms together with X and N, when X is —S— or —O— and D is a group other than a hydrogen atom, R is not a phenyl group or substituted phenyl group, and when X is —S— or —O— and D is a hydrogen atom, B and R are not a phenyl group or substituted phenyl groups at the same time; When X is —N< and both of E and D are groups other than a hydrogen atom, R is not a phenyl group or substituted phenyl group, when only E is a hydrogen atom, A and R are not a phenyl group or substituted phenyl groups at the same time, and when only D is a hydrogen atom, B and R are not a phenyl group or substituted phenyl groups; and the sum of the number of carbon atoms of A, B, D, E and R is at least 10.

On the compounds expressed by formula (I)-a, those expressed by formula (I)-b are novel compounds.

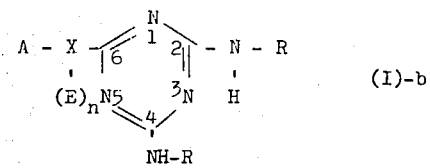

(I)-b wherein X is a member selected from the group consisting of —N<, —S— and —O—, when X is —N<, n is 1 and when X is —S— or —O—, n is zero; A is a member selected from the group consisting of alkyl groups having 1 to 18 carbon atoms, alkenyl groups having 3 to 18 carbon atoms, cycloalkyl groups having 3 to 6 carbon atoms, a benzyl group, substituted benzyl groups, cyanoalkyl groups having 3 to 5 carbon atoms, dialkylamino groups having 2 to 8 carbon atoms, a phenyl group and substituted phenyl groups; R is —N(R$^1$)$_2$, in which two R$^1$ groups are the same or different and represent an alkyl group having 1 to 4 carbon atoms; E is a member selected from the group consisting of a hydrogen atom and the same group as defined above with respect to A, and A and E may together form a heterocyclic ring having 2 to 5 carbon atoms together with X; and the sum of carbon atoms contained in A, E and R is at least 10.

The compound of formula (I)-b can be easily produced by any known procedure. For example, it can be produced as follows:

Using cyanuric chloride or cyanuric bromide as a material, the introduction of group

is first performed, and then the introduction of the —NHR group is performed. If the introduction of —NHR is first performed, the intended compound cannot be obtained. Accordingly, it is necessary to introduce

in the first place. Specifically, 1 mol of cyanuric chloride is dispersed in a medium such as acetone, methyl ethyl ketone or dioxane at a temperature of not more than 5° C., and on addition of ice water, cyanuric chloride is finely dispersed. To this mixture is then added 1 mol of a primary amine or secondary amine (for example, octylamine, laurylamine, stearylamine, cyclohexylamine, benzylamine, p-chloroaniline, 2,5-dichloroaniline, p-toluidine, o-toluidine, laurylamine, dibenzylamine, diphenylamine, or dicyclohexylamine), a hydroxyl-containing compound (for example, pentachlorophenol, p-t-butylphenol, o-cresol, phenol, 2,4-dichlorophenol, or lauryl alcohol), or a thiol-containing compound (for example, octyl mercaptan, lauryl mercaptan, stearyl mercaptan, benzyl mercaptan, or phenyl mercaptan), and the reaction is performed at a temperature of not more than 5° C. using sodium hydroxide, sodium carbonate, sodium bicarbonate or a water-soluble organic tertiary amine as an acid scavenger. The reaction product is filtered and washed with water to form a monosubstituted-4,6-dichloro-s-triazine. Since the preparation of the crystals of this mono-substituted product is desirable in commercial practice, it is desirable to use ring-containing compounds rather than aliphatic compounds as the amines, hydroxyl-containing compounds and mercaptans. One mol of the resulting mono-substituted-4,6-dichloro-s-triazine is dispersed in a lower alcohol such as methanol or ethanol at a temperature of not more than 5° C. (preferably, the amount of the alcohol is about 5 to 7 times as large as that of the triazine). With stirring, 2.5 molar times of a dialkylhydrazine such as asym-dimethylhydrazine or asym-diethylhydrazine is added dropwise, and the mixture is maintained at not more than 15° C. Since considerable generation of heat occurs, the addition should be done with great care, and after the end of the addition, 2 mols of sodium hydroxide or sodium carbonate as a ca. 10 percent aqueous solution is added dropwise as an acid scavenger. With the progress of the reaction, the contents become milky, and this indicates the progress of the reaction. After the end of the addition of alkali, the mixture was heated to ca. 40° C and stirred for one hour. While the lower alcohol is being removed at reduced pressure, water is added. Then, the contents are obtained as crystals. On cooling, filtration and washing with water, a pure product directly usable as a gas-fade inhibitor can be obtained in a yield of 75–60 percent. If desired, the product is re-precipitated or re-crystallized to form a purer product. Thus, the compound of formula (I)-b can be easily obtained.

When 2 mols of the dialkylhydrazine are first reacted with 1 mol of cyanuric chloride, it is impossible to obtain a triazine derivative having two dialkylhydrazines reacted therewith in good yield, perhaps because the hydrolysis of cyanuric chloride is facilitated.

The compound of formula (I)-a can be easily prepared by employing a known method. As is said generally in the substitution reaction of cyanuric chloride, it is successively reacted with compounds in the order of increasing reactivity, and three substitutions can be effected. In commercial production, it is preferred to use water-soluble materials and to obtain the products as water-insoluble compounds as the substitution proceeds. Water-insoluble materials remain unreacted partly, and cause a decrease in the purity of the final product.

The substitution products obtained differ greatly in physical properties according to the type of the substituents. Generally, a substitution product having the same three or two substituents (that is, having good symmetry) has suitable crystallinity and melting point, and is used conveniently in the present invention. Where all of the three substituents are different from each other, the resulting product generally has poor crystallinity and a low melting point, and is sometimes obtained as a liquid. Furthermore, the products have higher melting points and better crystallinity when the substituents are cyclic (aromatic or alicyclic) substituents than when they are aliphatic.

Compounds of formula (I)-a wherein X and Y are —NH— have superior crystallinity. Compounds having introduced thereto —O—, —S— or —N< have inferior crystallinity and melting points to the above compounds, but have good solubility in organic solvents. Therefore, these triazine derivatives are also used conveniently as gas-fade inhibitors.

The yield of the triazine derivative is 70 to 95 percent, and the products having good symmetry in which three or two substituents are the same are obtainable in a yield of 80 to 95 percent. The products in which the three substituents are different from each other have relatively low melting points, and are obtainable in a relatively low yield of 75 – 85 percent.

There is a general tendency that with the compounds of formula (I)-a, the yield decreased in the order of —NH—, -N<, —S—, and —O—. Furthermore, the alicyclic and aromatic substituents give greater yields than the aliphatic substituents.

In view of the structure of the triazine derivative used in the present invention and the gas-fade inhibiting effect, those triazine derivatives in which the substituents are a combination of a group having a high hydrophobicity such as a stearyl group and a group having a low hydrophobicity such as a methyl or ethyl group are preferred to those in which the three substituents show the same molecular chain and structure. In other words, it is desirable that the molecules are oriented to some extent.

Generally, the presence of —NH— as X or Y is most important for the gas-fade inhibiting action of the compound of formula (I)-a. Accordingly, the gas-fade inhibiting effect decreases with the number of —NH— groups decreasing from 3, 2 to 1. However, —N<η, —O— and —S— are very important when seen as a structure in its entirety, and play an auxiliary role together with —Nh—. Furthermore, these groups have an effect of increasing the solubility and bringing about an orientation of the molecules. As already mentioned, triazine derivatives in which an aromatic group is present in direct linkage to the three —NH— groups have no effects on polyurethanes, and are completely excluded from the present invention. Furthermore, triazine deiivatives in which an —NH₂ group is directly bonded to the triazine ring such as melamine or mono-substituted melamines are readily soluble in water, sparingly soluble in organic solvents, and react undesirably with isocyanates. Moreover, they have a reduced gas-fade inhibiting effect, and have poor compatibility with polyurethanes or cellulose acetates.

The compounds of formula (I) will be classified below according to various combinations of X and Y.

Where X and Y are both —N<

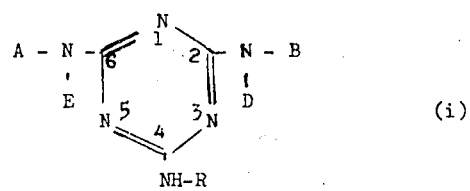

(i)

Specific examples of the triazine derivatives of formula (i) are given in Table 1.

Table 1

| Compound No. | Compound | Groups A | B | D | E | R | Melting point or boiling point (°C.) |
|---|---|---|---|---|---|---|---|
| 1 | 2,4-bis-benzylamino-6-stearyl-amino-s-triazine | benzyl | benzyl | H | H | stearyl | 87–90 |
| 2 | 2,4-bis-allylamino-6-cyclo-hexylamino-s-triazine | allyl | allyl | H | H | cyclohexyl | 204–206 |
| 3 | 2-butylamino-4-anilino-6-hexylamino-s-triazine | butyl | phenyl | H | H | hexyl | glassy Solid |
| 4 | 2-propylamino-4-butylamino-6-octylamino-s-triazine | propyl | butyl | H | H | octyl | 200–205 /0.5 mm Hg |
| 5 | 2-hexylamino-4-anilino-6-(p-toluidino)-s-triazine | hexyl | phenyl | H | H | p-toluidino | glassy solid |
| 6 | 2-hexylamino-4-anilino-6-benzylamino-s-triazine | hexyl | phenyl | H | H | benzyl | 260–265 /0.4 mm Hg |
| 7 | 2,4,6-tris-cyclohexylamino-s-triazine | cyclohexyl | cyclohexyl | H | H | cyclohexyl | 195–196 |
| 8 | 2,4,6-tris-benzylamino-s-triazine | benzyl | benzyl | H | H | benzyl | 155–158 |
| 9 | 2,4,6-tris-phenylhydrazino-s-triazine | phenylamino | phenylamino | H | H | phenylamino | 240–241 |
| 10 | 2,4,6-tris-allylamino-s-triazine | allyl | allyl | H | H | allyl | — |
| 11 | 2,4-bis-stearylamino-6-ethylamino-s-triazine | stearyl | stearyl | H | H | ethyl | 71–76 |
| 12 | 2,4-bis-allylamino-6-stearyl-amino-s-triazine | allyl | allyl | H | H | stearyl | 93–97 |
| 13 | 2,4-bis-stearylamino-6-asym-dimethylhydrazino-s-triazine | stearyl | stearyl | H | H | dimethyl-amino | 45–48 |
| 14 | 2(p-chloroanilino)-4,6-bis-asym-dimethylhydrazino-s-triazine | p-chloro-anilino | dimethyl-amino | | H | dimethyl-amino | 123–125 |
| 15 | 2-(2',5'-dichloroanilino)-4,6-bis-asym-dimethyl-hydrazino-2-triazine | 2,5-dichlo-roanilino | dimethyl-amino | | H | dimethyl-amino | 135–139 |
| 16 | 2-(o-toluidino,-4,6-bis-asym-dimethylhydrazino-s-triazine | o-toluidino | dimethyl-amino | | H | dimethyl-amino | 136–141 |
| 17 | 2-cyclohexylamino-4,6-bis-asym-dimethylhydrazino-s-triazine | cyclohexyl | dimethyl-amino | H | H | dimethyl-amino | — |
| 18 | 2,4-bis-benzylamino-6-morpholino-s-triazine | morpholino | benzyl | H | — | benzyl | 185–187 |
| 19 | 2,4-bis-stearylamino-6-morpho-lino-s-triazine | morpholino | stearyl | H | — | stearyl | 64–66 |
| 20 | 2,4-bis-allylamino-6-morpho-lino-s-triazine | morpholino | allyl | H | — | allyl | 75–77 |
| 21 | 2,4-bis-laurylamino-6-diiso-propylamino-s-triazine | isopropyl | lauryl | H | isopropyl | lauryl | Waxy solid |
| 22 | 2,4-bis-butylamino-6-dicyclo-hexylamino-s-triazine | cyclohexyl | butyl | H | cyclohexyl | butyl | 95–101 |
| 23 | 2,4-bis-cyclohexylamino-6-dibutylamino-s-triazine | butyl | cyclohexyl | H | butyl | cyclohexyl | — |
| 24 | 2,4-bis-stearylamino-6-dibutylamino-s-triazine | butyl | stearyl | H | butyl | stearyl | Waxy solid |
| 25 | 2-ethylamino-4-isopropyl-amino-6-piperazino-s-triazine | piperadino | butyl | H | — | isopropyl | 127–130 |
| 26 | 2-butylamino-4-hexylamino-6 piperidino-s-triazine | piperidino | ethyl | H | — | hexyl | oil |
| 27 | 2-butylamino-4-hexylamino-6-dibenzylamino-s-triazine | benzyl | butyl | H | benzyl | hexyl | 250–256 /0.6 mm Hg |
| 28 | 2-dibenzylamino-4,6-bis-asym-dimethylhydrazino-s-triazine | benzyl | dimethylamino | benzyl | H | dimethyl-amino | 135–139 |
| 29 | 2-diphenylamino-4,6-bis-asym-dimethylhydrazino-s-triazine | phenyl | dimethylamine | phenyl | H | dimethyl-amino | 55–56 |
| 30 | 2,6-bis-morpholino-4-stearyl-amino-s-triazine | morpholino | morpholino | — | — | stearyl | 73–76 |
| 31 | 2,6-bis-morpholino-4-cyclo-hexylamino-s-triazine | morpholino | morpholino | — | — | cyclohexyl | 172–175 |
| 32 | 2,6-bis-morpholino-4-benzyl-amino-s-triazine | morpholino | morpholino | — | — | benzyl | 164–166 |
| 33 | 2,6-bis-dibutylamino-4-butylamino-s-triazine | butyl | butyl | butyl | butyl | butyl | oil |
| 34 | 2,6-bis-diallylamino-4-benzylamino-s-triazine | allyl | allyl | allyl | allyl | benzyl | glassy solid |
| 35 | 2,6-bis-diethylamino-4-laurylamino-s-triazine | ethyl | ethyl | ethyl | ethyl | lauryl | Waxy solid |
| 36 | 2,6-bis-(β-dicyanoethylamino)-4-cyclohexylamino-s-triazine | β-cyanoethyl | β-cyanoethyl | β-cyanoethyl | β-cyanoethyl | cyclohexyl | — |
| 37 | 2,6-bis-ethyleneimino-4-stearylamino-s-triazine | ethylene | ethylene | — | — | stearyl | 81–83 |
| 38 | 2-piperazino-4-propylamino-6-morpholino-s-triazine | piperadino | morpholino | — | — | propyl | 149–152 |

Table 1-continued

| Compound No. | Compound | Groups A | B | D | E | R | Melting point or boiling point (°C.) |
|---|---|---|---|---|---|---|---|
| 39 | 2-dibutylamino-4-butylamino-6-diethylamino-s-triazine | ethyl | butyl | butyl | ethyl | butyl | 130–135 /0.1 mm Hg |
| 40 | 2,6-bis-morpholino-4-(p-chlorobenzylamino)-s-triazine | morpholino | morpholino | — | — | p-chlorobenzyl | 165–166 |

Where either X or Y is —N< and the other is —S—

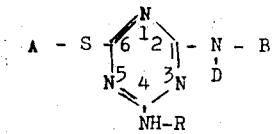

Wherein either X or Y is —N< and the other is —O—

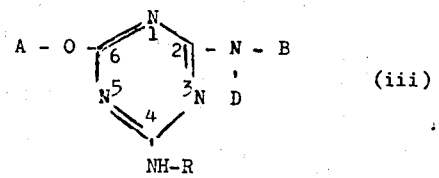

(iii)

Specific examples of the triazine derivatives of formula (ii) are given in Table 2.

Table 2

| Compound No. | Compound | Groups A | B | D | R | m. p. (°C.) |
|---|---|---|---|---|---|---|
| 41 | 2,4-bis-benzylamino-6-stearylthio-s-triazine | stearyl | benzyl | H | benzyl | 92–93 |
| 42 | 2,4-bis-benzylamino-6-laurylthio-s-triazine | lauryl | benzyl | H | benzyl | 93–95 |
| 43 | 2,4-bis-isopropylamino-6-butylthio-s-triazine | butyl | isopropyl | H | isopropyl | 76–79 |
| 44 | 2,4-bis-ethylamino-6-(p-methyl-phenylthio)-s-triazine | p-methylphenyl | ethyl | H | ethyl | 113–115 |
| 45 | 2,4-bis-ethylamino-6-(p-chlorophenylthio)-s-triazine | p-chlorophenyl | ethyl | H | ethyl | 112–113 |
| 46 | 2,4-bis-allylamino-6-benzylthio-s-triazine | benzyl | allyl | H | allyl | 120–125 |
| 47 | 2,4-bis-octylamino-6-stearylthio-s-triazine | stearyl | octyl | H | octyl | Waxy solid |
| 48 | 2,4-bis-(t-butylamino)-6-ethylthio-s-triazine | ethyl | t-butyl | H | t-butyl | 165–169 |
| 49 | 2,4-bis-asym-dimethylhydrazino-6-laurylthio-s-triazine | lauryl | dimethylamino | H | dimethylamino | 56–58 |
| 50 | 2,4-bis-asym-dimethylhydrazino-6-stearylthio-s-triazine | stearyl | dimethylamino | H | dimethylamino | 63–67 |
| 51 | 2-dibutylamino-4-cyclohexylamino-6-stearylthio-s-triazine | stearyl | butyl | butyl | cyclohexyl | Waxy solid |
| 52 | 2-morpholino-4-laurylamino-6-laurylthio-s-triazine | lauryl | morpholino | — | lauryl | Waxy solid |
| 53 | 2-diallylamino-6-benzylamino-6-methylthio-s-triazine | methyl | allyl | allyl | benzyl | — |

Specific examples of the triazine derivatives of formula (iii) are given in Table 3 below.

Table 3

| Compound No. | Compound | Groups A | B | D | R | m. p. (°C.) |
|---|---|---|---|---|---|---|
| 54 | 2,4-bis-cyclohexylamino-6-methoxy-s-triazine | methyl | — | H | cyclohexyl | 124–126 |
| 55 | 2,4-bis-stearylamino-6-methoxy-s-triazine | methyl | — | H | stearyl | 80–88 |
| 56 | 2,4-bis-(β-cyanoethylamino)-6-butoxy-s-triazine | butyl | — | H | β-cyanoethyl | 115–119 |
| 57 | 2,4-bis-allylamino-6-butoxy-s-triazine | butyl | — | H | allyl | oil |
| 58 | 2,4-bis-methallylamino-6-butoxy-s-triazine | butyl | — | H | methallyl | 58–60 |
| 59 | 2,4-bis-ethylamino-6-phenoxy-s-triazine | phenyl | — | H | ethyl | 100–101 |
| 60 | 2,4-bis-isopropylamino-6-(o-cresoxy)-s-triazine | o-methylphenyl | — | H | isopropyl | 115–116 |
| 61 | 2,4-bis-isopropylamino-6-(2,4-dichlorophenoxy)-s-triazine | 2,4-dichlorophenyl | — | H | isopropyl | 110–112 |
| 62 | 2,4-bis-butylamino-6-pentachlorophenoxy-s-triazine | pentachlorophenyl | — | H | butyl | — |

Table 3-continued

| Compound No. | Compound | Groups A | B | D | R | m. p. (° C.) |
|---|---|---|---|---|---|---|
| 63 | 2,4-bis-stearylamino-6-hexoxy-s-triazine | hexyl | — | H | stearyl | Waxy solid |
| 64 | 2,4-bis-laurylamino-6-butoxy-s-triazine | butyl | — | H | lauryl | Waxy solid |
| 65 | 2,4-bis-asym-dimethylhydrazino-6-(o-cresoxy)-s-triazine | o-methyl phenyl | dimethylamino | H | dimethylamino | 109–115 |
| 66 | 2,4-bis-asym-dimethylhydrazino-6-(2,4-dichlorophenoxy)-s-triazine | 2,4-dichloro-phenyl | dimethylamino | H | dimethylamino | — |
| 67 | 2-dibutylamino-4-laurylamino-2-butoxy-s-triazine | butyl | butyl | butyl | lauryl | oil |
| 68 | 2-diallylamino-4-cyclohexylamino-6-allyloxy-s-triazine | allyl | allyl | allyl | cyclohexyl | glassy solid |
| 69 | 2-dimethylamino-6-stearylamino-6-methoxy-s-triazine | methyl | methyl | methyl | stearyl | Waxy solid |

Where both X and Y are —S—

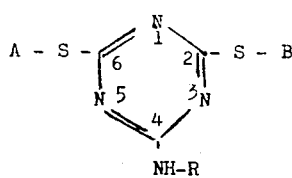

(iv)

Specific examples of the triazine derivatives of formula (iv) are given in Table 4.

Where both X and Y —O—

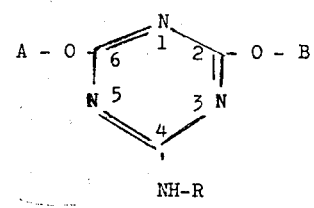

(v)

Table 4

| Compound No. | Compound | Groups A | B | R | Melting point (° C) |
|---|---|---|---|---|---|
| 70 | 2,6-bis-methylthio-4-cyclohexylamino-s-triazine | methyl | methyl | cyclohexyl | — |
| 71 | 2,6-bis-ethylthio-4-benzylamino-s-triazine | ethyl | ethyl | benzyl | 151–155 |
| 72 | 2,6-bis-methylthio-4-laurylamino-s-triazine | methyl | methyl | lauryl | 72–73 |
| 73 | 2,6-bis-methylthio-4-stearylamino-2-triazine | methyl | methyl | stearyl | 80–85 |
| 74 | 2,6-bis-phenylthio-4-stearylamino-s-triazine | phenyl | phenyl | stearyl | waxy solid |
| 75 | 2-6-bis-laurylthio-4-cyclohexylamino-s-triazine | lauryl | lauryl | cyclohexyl | 66 |

Table 5

| Compound No. | Compound | Groups A | B | R | Melting point (° C) |
|---|---|---|---|---|---|
| 76 | 2,6-bis-allyloxy-4-dodecylamino-s-triazine | allyl | allyl | dodecyl | 49–51 |
| 77 | 2,6-bis-phenoxy-4-laurylamino-s-triazine | phenyl | phenyl | lauryl | 75–78 |
| 78 | 2,6-bis-methoxy-4-stearylamino-s-triazine | methyl | methyl | stearly | 140–146 |
| 79 | 2,6-bis-butoxy-4-benzylamino-s-triazine | butyl | butyl | benzyl | glassy solid |
| 80 | 2,6-bis-cyclohexoxy-4-cyclohexylamino-s-triazine | cyclohexyl | cyclohexyl | cyclohexyl | glassy solid |
| 81 | 2,6-bis-allyloxy-4-stearylamino-s-triazine | allyl | allyl | stearyl | waxy solid |
| 82 | 2,6-bis-(2,4,6-tribromophenoxy)-4-octylamino-s-triazine | 2,4 6-tri-bromo- | 2,4,6-tri-bromo- | octyl | 190–192 |

Table 5-continued

| Compound No. | Compound | Groups A | B | R | Melting point (° C.) |
|---|---|---|---|---|---|
| | | phenyl | phenyl | | |

Where either X or Y is —S— and the other is —O—

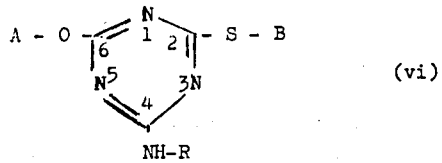

(vi)

Specific examples of the compounds of formula (vi) are given in Table 6 below.

Table 6

| Compound No. | Compound | Groups A | B | R | Melting point (° C.) |
|---|---|---|---|---|---|
| 83 | 2-methylthio-4-dodecylamino-6-butoxy-s-triazine | butyl | methyl | dodecyl | 40–45 |
| 84 | 2-methylthio-4-stearylamino-6-methoxy-s-triazine | methyl | methyl | stearyl | 140–145 |
| 85 | 2-ethylthio4-cyclohexylamino-6-ethoxy-s-triazine | ethyl | ethyl | cyclo- | waxy |
| 86 | 2-butylthio-4-octylamino-6-phenoxy-s-triazine | phenyl | butyl | octyl | glassy solid |

The anti-gas-fade polymer composition of this invention is obtained by incorporating the gas-fade inhibitor described above into a polymer selected from the group consisting of polyurethanes and cellulose acetates in an amount of not more than 10 percent by weight, preferably 0.3 to 8 percent by weight based on the weight of the polymer. If the amount is below 0.3 percent by weight, the effect of the gas-fade inhibitor is lowered, and if it is above 10 percent by weight, the properties of the polymer, such as tenacity or elongation, tend to be reduced. In an embodiment wherein the gas-fade inhibitor is incorporated into a shaped article of the polymer (for example, when a filament of the polymer is dyed with a dye bath containing the above fade-inhibitor), an excess amount of the inhibitor causes the surface of the filament to be harsh, and therefore it is preferred that the amount should be not more than about 8 percent by weight.

There is no particular restriction in the means for incorporating the gas-fade inhibitor of this invention into polyurethanes and cellulose acetates, and various expedients can be employed.

For example, the gas-fade inhibitor of this invention may be incorporated into starting monomers before the initiation of addition polymerization for producing polyurethane elastomers, or may be added at the initiation of, during, or after the end of the polymerization reaction. It is especially preferred to mix and disperse it in the polyurethane elastomer. In the case of cellulose acetates, it may be mixed with the flakes of cellulose acetates, or with a spinning mass obtained by dissolving the cellulose acetate polymer in an organic solvent such as acetone, ethylene dichloride or dimethyl formamide.

Furthermore, it may be added before or during the shaping of the polymer. Or it is also possible to contact a shaped article of the polymer with a solution or aqueous emulsion of the gas-fade inhibitor by such means as immersion or spray. Moreover, the inhibitor may be added in a dye bath, and incorporated into the polymer at the same time as dyeing. In short, the gas-fade inhibitor of this invention can be incorporated into the polymer at any desired stage from the production of the polymer to the finishing of a shaped article of the polymer. The solvent used for producing the solution of the inhibitor may, for example, be a lower aliphatic alcohol such as methanol, ethanol, n-propanol or isopropanol, or a relatively low boiling halogenated hydrocarbon such as carbon tetrachloride, chloroform, tetrachloroethylene or trichloroethylene. These solvents may also serve for dispersing the inhibitor in the polymer. The emulsifying agent used to form the aqueous emulsion may, for example, be a nonionic surface active agent or an anionic surface active agent used either alone or in combination. Specific examples are sodium dodecylbenzene sulfonate, lauryl sulfate and alkylphenol/ethylene oxide adducts obtained by the addition of 10 – 30 mols of ethylene oxide to an alkylphenol whose alkyl group contains 8 to 15 carbon atoms. These emulsifying agents are preferably used in admixture in order to improve the stability of the emulsion.

The most preferred method of incorporating the gas-fade inhibitor of this invention is to add the inhibitor before the fabrication of the polymer thereby to impart a gas-fade inhibiting effect to the polymer itself. Generally, the gas-fade-inhibiting activity is more durable when the inhibitor is incorporated into the polymer than when it is incorporated in the step of dyeing a shaped article of the polymer.

The polymer component of the anti-gas-fade polymer composition is selected from polyurethanes and cellulose acetates. Of course, this composition may contain other polymers which are compatible with these polymers.

Examples of the polyurethanes are polyurethane elastomers having a urethane linkage, urea linkage and acid amide linkage in the main chain. These polyurethane elastomers are generally prepared by reacting hydroxyl-containing polyether glycols or polyester glycols having a molecular weight of 500 to 6,000 with excessive moles of organic diisocyanates to form isocyanate-terminated prepolymers and reacting the prepolymers with bifunctional compounds such as a diamine, diol, hydrazine, water or hydroxylamine in a polar solvent such as dimethyl formamide, dimethyl acetamide or dimethyl sulfoxide to extend the chain, and if desired reacting the product with an end blocking agent. It is to be noted however that the polyurethanes that can be used in the present invention are not limited to those obtained by the above method.

The cellulose acetates may be those obtained by acetylation of rayon pulp, most typically diacetyl cellulose and triacetyl cellulose.

The anti-gas-fade polymer composition of this invention may further include known additives generally used with the above polymers. Examples of such additives are an ultraviolet absorbent, antioxidant, coloring agent, delusterant and filler. The composition of this invention may be in various forms. For example, it may be molding powder, granules, pellets flakes and chips, or a shaped articles such as filaments, fibers, tows, yarns, knitted fabric, woven fabric, non-woven fabric, films (including coated and laminated films), or sheets.

The following Examples and Comparative Examples will illustrate the present invention.

The gas-fade test in these Examples was conducted by the following method.

TESTING METHOD FOR COLOR FASTNESS TO OXIDES OF NITROGEN (JIS L 0855)

Apparatus and Material:
1. Apparatus: A glass vessel having a capacity of about 15 liters which permits the test piece inside to be clearly seen from outside. Vanes are fitted so that gases generated inside can be uniformly stirred. The vanes are rotated at 70 to 80 rpm. A tripod is placed in the inside of the vessel. A 500 ml. evaporation dish is placed on the tripod, and a test piece pincher is placed at the bottom of the tripod.
2. Phosphoric acid: Phosphoric acid of grade 1 (reagent) stipulated in JIS K 9003.
3. Sodium nitrite solution: A solution of 10 g of sodium nitrite (reagent, grade 1 stipulated in JIS K 8019) in 1 liter of distilled water.
4. Urea: Urea (reagent) of grade 1 stipulated in JIS K 8731
5. Anionic surfactant of dioctyl sodium sulfosuccinate: pure content at least 70 percent, the alcohol-insoluble matter not more than 0.1 percent, pH 6 to 7.
6. Standard dyed cloth: An acetate woven cloth dyed with Celanthrene Brilliant Blue FFS (DuPont) in a prescribed density (the concentration of the dye should be about 0.5 percent), its size being in principle 5 cm × 4 cm in each unit.

Preparation of the test piece:
The size of the test piece is usually 10 cm × 4 cm. In the case of yarns, they are arranged parallel in a thin layer or knitted into a cloth or wound parallel in a frame (for example, a U-shaped wire).

OPERATION

To the pincher at the bottom of the tripod suspended from a circular iron wire, the test piece and the standard dyed cloth are fitted radially at a distance of 3 cm therebetween. An evaporation dish is placed thereon which contains a mixture of 375 ml. of distilled water and 6.7 ml. of phosphoric acid (85 percent). 25 ml. of an aqueous solution of sodium nitrite is added, and quickly, a lid is placed on the apparatus. The rotary vanes are rotated at a prescribed speed to made the inside gas uniform. The standard dyed cloth is observed from outside, and when the color of the cloth becomes the prescribed color of the standard color faded cloth, the rotation of the vanes is immediately stopped. The lid is removed, and the evaporation dish is also removed. The test piece is taken out into fresh air together with the tripod. One-third of each test piece is cut out, and used as a one unit testpiece for evaluation. Then, the standard color-faded cloth is exchanged with a new standard dyed cloth, and the apparatus is again assembled. In the same manner, test is conducted using a second unit and a third unit. The test is performed under standard conditions in principle while avoiding direct sunlight. The test piece which has been exposed to nitrogen oxide gas is as immediately as possible immersed in an aqueous solution containing 5 g of urea and 1 g of an anionic surfactant of dioctylsodium sulfosuccinate per liter of the solution (20 ± 2° C.) for 5 minutes, then rinsed with distilled water, dehydrated between sheets of filter paper, and dried in air.

When all of the test piece pincher is not filled with the test piece, a white cloth the same size as the test piece is mounted.

EVALUATION

The evaluation of the fading of the color of the test piece is determined by the following standards using a fading gray scale (JIS L 0804).

| Grade | Standard of evaluation |
| --- | --- |
| 5 | In a test of one unit, the color change is beyond No. 3 in the gray scale |
| 4 | In a test of one unit, the color change is beyond No. 4 and up to No. 3 in the gray scale |
| 3 | In a test of one unit, color change is observed and the degree of the color change is up to No. 4 in the gray scale |
| 2 | A color change is not observed in a test of one unit, and in a test of 2 units, the color change is beyond No. 4 and up to No. 3 in the gray scale |
| 1 | In tests of 2 or 3 units, color change is up to No. 4 in the gray scale |

EXAMPLES 1 TO 18 AND COMPARATIVE EXAMPLES 1 TO 18

A prepolymer was prepared from polytetramethylene glycol having average molecular weight of 2,000 and diphenylmethane-4,4'-diisocyanate, and then dissolved in dimethyl formamide. With stirring, an aqueous solution of hydrazine and diethylamine were added to extend the chain and block the terminals. Furthermore, 2 percent by weight of titanium oxide was added to form a dimethylformamide solution of polyurethane.

The polyurethane solution thus obtained was divided into portions. Each of the compounds shown in Table 7 was added to 100 parts (30 parts as polyurethane) of each of the resulting portions in an amount of 3 percent by weight. Each of the mixtures obtained was cast on a glass sheet to form a film. After allowing the film to stand for one day, it was washed with flowing water for 8 hours, and further treated for 20 minutes at 100° C. The resulting films were used for the gas-fade test.

10 and 11, the gas-fade inhibiting effect was grade 5 or more, showing poor durability. In Comparative Examples 16 to 18, the hydrophobicity of the surface of the film was strong, and the film repelled water. The gas-fade inhibiting effect of this film was very non-uniform, Table 7

| No. | additive used | gas-fade Test (grade) | No. | additive used | gas-fade Test (grade) |
|---|---|---|---|---|---|
| Ex - 1 | Table-1 No. 1 | 1–2 | Comparative Example 1 | not added | 5 |
| 2 | Table-1 No. 2 | 1–2 | Comparative Example 2 | Comparison compound No. 1 | 5 |
| 3 | Table-1 No. 3 | 2 | Comparative Example 3 | Comparison compound No. 2 | 5 |
| 4 | Table-1 No. 4 | 1–2 | Comparative Example 4 | Comparison compound No. 3 | 5< |
| 5 | Table-1 No. 8 | 1–2 | Comparative Example 5 | Comparison compound No. 4 | 4–5 |
| 6 | Table-1 No.10 | 1–2 | Comparative Example 6 | Comparison compound No. 5 | 5< |
| 7 | Table-1 No. 14 | 1–2 | Comparative Example 7 | Comparison compound No. 6 | 5 |
| 8 | Table-1 No. 16 | 2 | Comparative Example 8 | Comparison compound No. 7 | 2–3 |
| 9 | Table-1 No. 18 | 2 | Comparative Example 9 | Comparison compound No. 8 | 5< |
| 10 | Table-1 No. 20 | 1–2 | Comparative Example 10 | Comparison compound No. 9 | 2 |
| 11 | Table-1 No. 22 | 2 | Comparative Example 11 | Comparison compound No. 10 | 2 |
| 12 | Table-1 No. 28 | 1–2 | Comparative Example 12 | Comparison compound No. 11 | 3 |
| 13 | Table-1 No. 30 | 1–2 | Comparative Example 13 | Comparison Compound No. 12 | 5 |
| 14 | Table-1 No. 31 | 1–2 | Comparative Example 14 | Comparison compound No. 13 | 3–4 |
| 15 | Table-1 No. 32 | 1–2 | Comparative Example 15 | Comparison compound No. 14 | 3–4 |
| 16 | Table-1 No. 35 | 2 | Comparative Example 16 | Comparison compound No. 15 | 2–3 |
| 17 | Table-1 No. 36 | 2 | Comparative Example 17 | Comparison compound No. 16 | 2–3 |
| 18 | Table-1 No. 37 | 1–2 | Comparative Example 18 | Comparison compound No. 17 | 2–3 |

Note; Comparison Compounds in the Comparative Examples
No. 1 — 2,4,6-tris-dimethylamino-s-triazine
No. 2 — 2,4,6-tris-dibutylamino-s-triazine
No. 3 — 2,4,6-tris-phenylamino-s-triazine
No. 4 — 2,4,6-tris-morpholino--s-triazine
No. 5 — 2,4,6-tris-diallylamino-s-triazine
No. 6 — 2,4,6-tris-ethyleneimino-s-triazine
No. 7 — 2,4,6-tris-ethylamino-s-triazine
No. 8 — 2,4-bis-phenylamino-6-dibutylamino-s-triazine
No. 9 — 2,4,6-tris-methylamino-s-triazine
No. 10 — 2,4-bis-hydradino-6-dimethylamino-s-triazine
No. 11 — adipic acid dihydrazide
No. 12 — 1,1-dimethyl-stearyl-semicarbazide
No. 13 — poly(diethylaminoethylmethacrylate)
No. 14 — phenylurea
No. 15 — stearyl alcohol
No. 16 — stearic acid
No. 17 — stearic acid amide Each of the films obtained above was further immersed in an aqueous solution containing 0.5 g of lauryl sulfate per liter of solution and treated for 60 minutes at 100° C., washed with water and again dried for 20 minutes at 120° C., for use in the gas fade test. In Examples 1 to 18, no reduction in gas-fade inhibiting effect was observed, but in Comparative Examples 8, and a remarkable reduction in this effect was observed in parts.

EXAMPLES 19 TO 25 AND COMPARATIVE EXAMPLES 19 TO 26

The polyurethane solution prepared in Example 1 was divided into portions. Each of the compounds indicated in Table 8 was mixed in an amount of 2 percent by weight based on polyurethane with 100 parts each of the divided portions (30 parts as polyurethane). The mixture was fabricated into films in the same way as in Example 1 and tested for gas-fade inhibiting effect. The results are shown in Table 8.

poor durability of the effect. In Comparative Examples 24 and 25, the gas-fade inhibiting effect was grade 4–5, showing poor durability, the same as in Comparative Examples 19 and 22.

EXAMPLES 26 TO 34 AND COMPARATIVE

Table 8

| No. | additive used | gas-fade Test (grade) | Control No. | additive used | gas-fade Test (grade) |
|---|---|---|---|---|---|
| 19 | Table-2 No. 41 | 1–2 | 19 | Comparison compound No. 18 | 5< |
| 20 | Table-2 No. 43 | 2 | 20 | Comparison compound No. 19 | 3–4 |
| 21 | Table-2 No. 46 | 1–2 | 21 | Comparison compound NO. 20 | 5< |
| 22 | Table-2 No. 48 | 2 | 22 | Comparison compound No. 21 | 5 |
| 23 | Table-2 No. 49 | 1–2 | 23 | Comparison compound No. 22 | 3–4 |
| 24 | Table-2 No. 50 | 1–2 | 24 | Comparison compound No. 23 | 5 |
| 25 | Table-2 No. 53 | 2 | 25 | Comparison compound No. 24 | 4 |
|  |  |  | 26 | Comparison compound No. 25 | 3–4 |

Note: Comparison Compounds in the Comparative Examples
No. 18 — 2,4-bis-phenylamino-6-phenylthio-s-triazine
No. 19 — 2,4,6-tris-acetylamino-s-triazine
No. 20 — dilauryl thiopropionate
No. 21 — tridecylthiophosphite
No. 22 — triethanol amine
No. 23 — phenyl morpholine
No. 24 — 1,4-dibenzylmorpholine
No. 25 — N-phenylpiperadine Each of the films prepared in Table 8 was further immersed in an aqueous solution containing 0.5 g of lauryl sulfate per liter of solution and treated for 60 minutes at 100° C., followed by washing with water and drying. The treated films were tested for gas-fade inhibiting effects. In Examples 19 to 25, there was no reduction in the effect of gas-fade inhibition, but in Comparative Examples 19 and 22, the gas-fade inhibiting effect was grade 5, which was the same as that of a film in which the inhibitor was not incorporated. This shows

EXAMPLES 27 TO 32

The polyurethane solution prepared in Example 1 was divided into portions, and each of the compounds indicated in Table 9 was mixed with 100 parts each of the divided portions (30 parts as polyurethane) in an amount of 2.0 percent by weight based on the weight of polyurethane. The mixture was fabricated into films in the same way as in Example 1, and the films were tested for gas-fade inhibition. The results are shown in Table 9.

Table 9

| No. | Additive used | gas-fade Test (grade) | Control No. | Additive used | gas-fade Test (grade) |
|---|---|---|---|---|---|
| 26 | Table-3 No. 54 | 1–2 |  |  |  |
| 27 | Table-3 No. 55 | 2 | 27 | Comparison compound No. 27 | 5 |
| 28 | Table-3 No. 56 | 1–2 | 28 | Comparison compound No. 28 | 5 |
| 29 | Table-3 No. 58 | 1–2 | 29 | Comparison compound No. 29 | 4–5 |
| 30 | Table-3 No. 60 | 2 | 30 | Comparison compound No. 30 | 5< |
| 31 | Table-3 No. 64 | 1–2 | 31 | Comparison compound No. 31 | 5 |
| 32 | Table-3 No. 65 | 1–2 | 32 | Comparison compound No. 32 | 5< |
| 33 | Table-3 No. 67 | 2 |  |  |  |

Table 9-continued

| No. | Additive used | gas-fade Test (grade) | Control No. | Additive used | gas-fade Test (grade) |
|---|---|---|---|---|---|
| 34 | Table-3 No. 69 | 2 | | | |

Note: Comparison Compounds in the Comparative Examples
No. 27 — 2,4-bis-phenylamino-6-phenoxy-s-triazine
No. 28 — 2,4-bis-(p-chloroanilino)-6-(p-chlorophenoxy)-s-triazine
No. 29 — 1,3,5-trimethyl-2,4,6-tris(3,5-di-t-butyl-4-hydroxybenzyl)benzene
No. 30 — 2-(2'-hydroxy-3',5'-diisoamylphenyl)benzotriazol (Tinuvin -328, trademark of Ciba Geigy)
No. 31 — Tetrakis-[methylene-3-(3',5'-di-t-butyl-4'-hydroxyphenyl)propionate]methane (Irganox 1010 of Ciba Geigy)
No. 32 — 6-(4-hydroxy-3,5-di-t-butylanilino)-2,4-bis-octadecylthio-s-triazine (Irganox 565 trademark of Ciba Geigy)

EXAMPLES 35 TO 46 AND COMPARATIVE EXAMPLES 33 TO 36

The polyurethane solution prepared in Example 1 was divided into portions, and each of the compounds indicated in Table 10 was mixed in an amount of 3.0 percent by weight based on polyurethane with 100 parts (30 parts as polyurethane) each of the divided portions. The mixture was fabricated into films, and the films were tested for gas-fade inhibition. The results are shown in Table 10.

Table 10

| No. | Additive used | gas-fade Test (grade) | No. | Additive used | gas-fade Test (grade) |
|---|---|---|---|---|---|
| Ex. 35 | Table-4 No. 70 | 1–2 | Ex. 43 | Table-6 No. 83 | 2–3 |
| 36 | Table-4 No. 71 | 2 | 44 | Table-6 No. 84 | 2–3 |
| 37 | Table-4 No. 72 | 1–2 | 45 | Table-6 No. 85 | 2 |
| 38 | Table-4 No. 74 | 2–3 | 46 | Table-6 No. 86 | 2–3 |
| 39 | Table-5 No. 76 | 2 | Comparative Example 33 | Comparison compound No. 33 | 5 |
| 40 | Table-5 No. 78 | 2 | Comparative Example 34 | Comparison compound No. 34 | 5< |
| Ex. 41 | Table 5 No. 79 | 1–2 | Comparative Example 35 | Comparison compound No. 35 | 5< |
| 42 | Table 5 No. 81 | 2 | Comparative Example 36 | Comparison compound No. 36 | 5 |

Note: Comparison compouds in the Comparative Examples
No. 33 — 2,6-bis-phenylthio-4-phenylamino-s-triazine
No. 34 — 2,6-bis-butylthio-4-phenylamino-s-triazine
No. 35 — 2,6-bis-phenoxy-4-phenylamino-s-triazine
No. 36 — 2-phenylthio-4-phenylamino-6-phenoxy-s-triazine

EXAMPLES 47 TO 64 AND COMPARATIVE EXAMPLES 37 TO 47

The polyurethane solution prepared in Example 1 was divided into portions, and each of the compounds shown in Table 11 was mixed in an amount of 0.5, 3.0 and 6.0 percent by weight respectively with 100 parts (30 parts as polyurethane) each of the divided portions. The mixture was fabricated into films, and the films were tested for gas-fade inhibition. The results are shown in Table 8. In Table 11, (A) indicates that the additive was used in an amount of 0.5 percent by weight, (B), 3.0 percent by weight, and (C) 6.0 percent by weight.

Table 11

| No. | additive used | gas-fade Test (grade) A | B | C | No. | additive used | gas-fade Test (grade) A | B | C |
|---|---|---|---|---|---|---|---|---|---|
| Ex. 47 | Table 1 No. 2 | 2–3 | 1–2 | 1–2 | Ex. 62 | Table 5 No. 79 | 3 | 1–2 | 1–2 |
| 48 | Table 1 No. 4 | 2–3 | 1–2 | 1–2 | 63 | Table 5 No. 83 | 3–4 | 2 | 1–2 |
| 49 | Table 1 No. 14 | 3 | 1–2 | 1–2 | 64 | Table 5 No. 85 | 3 | 2 | 1–2 |
| 50 | Table 1 No. 20 | 2–3 | 1–2 | 1–2 | Comparative Example 37 | Comparison compound No. 1 | 5 | 5 | 5 |
| 51 | Table 1 No. 28 | 3 | 1–2 | 1–2 | Comparative Example 38 | Comparison compound No. 2 | 5 | 5 | 5 |
| 52 | Table 1 No. 31 | 3 | 1–2 | 1–2 | Comparative Example 39 | Comparison compound No. 9 | 3 | 2 | 2 |
| 53 | Table 2 No. 42 | 2–3 | 1–2 | 1–2 | Comparative Example 40 | Comparison compound No. 11 | 4–5 | 3 | 3 |
| Ex. 54 | Table 2 No. 46 | 3 | 1–2 | 1–2 | Comparative Example 41 | Comparison compound No. 15 | 3 | 2–3 | 2–3 |
| 55 | Table 2 No. 49 | 3 | 1–2 | 1–2 | Comparative Example 42 | Comparison compound No. 19 | 5 | 3–4 | 3–4 |
| 56 | Table 3 No. 54 | 2–3 | 1–2 | 1–2 | Comparative Example 43 | Compound No. 21 | 5 | 5 | 5 |
| 57 | Table 3 No. 64 | 3 | 1–2 | 1–2 | Comparative Example 44 | Comparison compound No. 25 | 5 | 3–4 | 3–4 |
| 58 | Table 3 No. 69 | 2–3 | 2 | 1–2 | Comparative Example 45 | Comparison compound No. 27 | 5< | 5< | 5< |
| 59 | Table 4 No. 70 | 2–3 | 1–2 | 1–2 | Comparative Example 46 | Comparison compound No. 32 | 5< | 5< | 5< |
| 60 | Table 4 No. 73 | 3 | 2 | 1–2 | Comparative | Comparison | | | |

Table 11-continued

| No. | additive used | gas-fade Test (grade) A | B | C | No. | additive used | gas-fade Test (grade) A | B | C |
|---|---|---|---|---|---|---|---|---|---|
| 61 | Table 5 No. 76 | 3 | 2 | 1–2 | Example 47 | compound No. 35 not added | 5<5 | 5<5 | 5<5 |

Each of the films obtained above was immersed in an aqueous solution containing 1 g of lauryl sulface per liter of solution and treated for 60 minutes at 100° C., washed with water, and dried. The gas-fade test was conducted on each of the test pieces. In Examples 47 to 64, no reduction in gas-fade inhibiting effect was observed, whereas in Comparative Examples 39, 40, 41, 42 and 44, the gas fade test evaluation was grade 4–5.

EXAMPLES 65 TO 72 AND COMPARATIVE EXAMPLES 48 TO 53

A prepolymer consisting of polytetramethylene glycol having an average molecular weight of 2000 and diphenylmethane diisocyanate was prepared by a known method, and then dissolved in dimethyl formamide. With stirring, a mixed solution of hydrazine hydrate and di-n-butylamine was added to extend the chain and block the terminals. To the resulting solution was added 3.0 percent by weight of each of the compounds indicated in Table 12, and 2.0 percent by weight of titanium dioxide was further added (both on the basis of the polyurethane). The mixture was dry spun to form a polyurethane elastomer yarn (40 De). The polyurethane solution not containing these additives was also dry spun to form a polyurethane elastomer yarn. Using these elastic yarns, the gas-fade test was conducted. The results are shown in Table 12.

Table 12

| Example Nos. | Additives used | Gas-fade test (grade) | Comparative Example | Additives used | Gas-fade test (grade) |
|---|---|---|---|---|---|
| 65 | No. 2 of Table 1 | 2 | 48 | Comparison compound No. 7 | 2–3 |
| 66 | No. 28 of Table 1 | 2 | 49 | Comparison compound No. 11 | 4–5 |
| 67 | No. 31 of Table 1 | 2 | 50 | Comparison compound No. 15 | 5 |
| 68 | No. 49 of Table 2 | 2 | 51 | Comparison compound No. 17 | 4–5 |
| 69 | No. 54 of Table 3 | 2 | 52 | Comparison compound No. 25 | 5 |
| 70 | No. 70 of Table 4 | 2–3 | 53 | Comparison compound No. 30 | 4–5 |
| 71 | No. 76 of Table 5 | 2–3 | 1 | not added | 5 |
| 72 | No. 83 of Table 6 | 3 | — | — | — |

Each of these elastic yarns was immersed in an aqueous solution containing sodium dodecylbenzenesulfonate in an amount of 1 g per liter of solution, and treated for 1 hour at 70° C., and boiled for 1 hour at 100° C., followed by thorough washing with water and drying. The treated yarns were tested for gas-fade inhibition. As a result, it was found that the gas-fade inhibiting effect was hardly reduced in the elastic yarns according to this invention, whereas in Comparative Example 48, the gasfade grade of the yarn after treatment was 5, showing no durability.

The compound used in Comparative Examples 50 and 51 showed relatively good gas-fade inhibiting effects in tests using films, but showed no effect on the yarns obtained by spinning. This shows that those compounds which show the effects by bleeding out on the surfaces of the shaped articles cannot substantially improve the antigas-fade property of the polyurethane polymer.

EXAMPLES 73 TO 87 AND COMPARATIVE EXAMPLES 54 TO 59

Three parts by weight of each of the compounds shown in Table 13 were dissolved in 50 parts by weight of a mixture (1:1:1) of methyl alcohol, isopropyl alcohol and benzene, and 1 part by weight of a nonylphenol/ethylene oxide adduct (9 mols as ethylene oxide) was mixed with them. The mixture was emulsified and dispersed in 50 parts by weight of water with vigorous agitation to form an aqueous dispersion containing 3 percent by weight of the effective ingredients.

A power net prepared by interweaving of nylon and 20 percent by weight of polyurethane which was dyed with a fluorescent dye was immersed in the above dispersion for 10 seconds and squeezed so that the content of the effective ingredient (compound of Table 13) was 2.0 percent by weight based on the weight of fiber, followed by heattreatment at 170° C. for 5 minutes. These test pieces including an untreated product were tested for gas-fade inhibition. The results are shown in Table 13.

Table 13

| Examples and comparative Examples | Additives used | Gas-fade test |
|---|---|---|
| 73 | No. 1 of Table 1 | 1 – 2 |
| 74 | No. 12 of Table 1 | 1 – 2 |
| 75 | No. 16 of Table 1 | 1 – 2 |
| 76 | No. 28 of Table 1 | 1 – 2 |
| 77 | No. 32 of Table 1 | 1 – 2 |
| 78 | No. 41 of Table 2 | 1 – 2 |
| 79 | No. 47 of Table 2 | 1 – 2 |
| 80 | No. 50 of Table 2 | 1 – 2 |
| 81 | No. 55 of Table 3 | 1 – 2 |
| 82 | No. 65 of Table 3 | 1 – 2 |
| 83 | No. 72 of Table 4 | 2 |
| 84 | No. 75 of Table 4 | 1 – 2 |
| 85 | No. 76 of Table 5 | 1 – 2 |
| 86 | No. 81 of Table 5 | 1 – 2 |
| 87 | No. 84 of Table 6 | 1 – 2 |
| Comparative Examples | | |
| 54 | Comparison compound No. 3 | greater than 5 |
| 55 | Comparison compound No. 9 | 1 – 2 |
| 56 | Comparison compound No. 15 | 1 – 2 |
| 57 | Comparison compound No. 20 | 2 – 3 |
| 58 | Comparison compound No. 26 | 2 – 3 |
| 59 | Comparison compound No. 34 | 4 – 5 |

These treated cloths were washed for 30 minutes using 1 g/liter of lauryl sulfate with water at 40° C. by a household washer, and then rinsed for 10 minutes with water at 25° C. The cloths were dried and tested for gas-fade inhibition. In Examples 73 to 87, the gas-fade test was of grades 2 to 2-3, but in Comparative Examples 55, 56, 57 and 58, the grade was 5, showing no durability.

EXAMPLES 88 TO 101 AND COMPARATIVE EXAMPLES 60 TO 68

An acetone solution containing 10 percent by weight of cellulose diacetate was divided in portions, and each of the compounds indicated in Table 14 was mixed in an amount of 1.0 percent by weight based on the weight of diacetate with 100 parts by weight (10 parts by weight as cellulose diacetate) of each of the divided portions. Each of the mixtures obtained was cast on a glass plate to form a film of a certain thickness using a doctor knife. The film was allowed to stand for 2 hours at room temperature, and upon the evaporation of acetone, a transparent film was obtained. The film obtained was dyed with Kayalon Fast Blue FN (disperse dye trademark of Nippon Kayaku Kogyo Kabushiki Kaisha) in a concentration of 3 percent o.w.f. for 60 minutes at 80° C. The goods-to-liquor ratio was 1:100. For comparison, a film not containing the compound of Table 14 was also tested for gas-fade inhibition.

Since the films obtained in Comparative Examples 61 and 63 became turbid because of insolubility in acetate, they were not tested for gas-fade inhibition.

The results are shown in Table 14.

Table 14

| Examples and Comparative Examples | Additives used | Gas-fade test (grade) |
|---|---|---|
| 88 | No. 2 of Table 1 | 1 – 2 |
| 89 | No. 14 of Table 1 | 1 – 2 |
| 90 | No. 20 of Table 1 | 1 – 2 |
| 91 | No. 28 of Table 1 | 2 |
| 92 | No. 32 of Table 1 | 1 – 2 |
| 93 | No. 46 of Table 2 | 1 – 2 |
| 94 | No. 53 of Table 2 | 2 – 3 |
| 95 | No. 58 of Table 3 | 2 |
| 96 | No. 60 of Table 3 | 2 |
| 97 | No. 65 of Table 3 | 2 |
| 98 | No. 70 of Table 4 | 2 |
| 99 | No. 71 of Table 4 | 2 – 3 |
| 100 | No. 79 of Table 4 | 2 |
| 101 | No. 85 of Table 6 | 2 |
| Comparative Examples | | |
| 60 | Comparison compound No. 1 | 4 – 5 |
| 61 | Comparison compound No. 3 | — |
| 62 | Comparison compound No. 9 | 4 – 5 |
| 63 | Comparison compound No. 15 | — |
| 64 | Comparison compound No. 19 | 3 – 4 |
| 65 | Comparison compound No. 23 | 5 |
| 66 | Comparison compound No. 24 | 4 – 5 |
| 67 | Comparison compound No. 25 | 4 – 5 |
| 68 | Comparison compound No. 26 | 5 |
| Control | not added | 5 |

EXAMPLES 102 TO 109 AND COMPARATIVE EXAMPLES 69 TO 71

Each of the compounds indicated in Table 15 was added in an amount of 1.0 percent by weight to a 15 percent solution of diacetyl cellulose, and the mixture was dry spun to form acetate filaments (100 de). Separately the above solution containing no additive was spun in the same way. Each of the resulting filaments was treated for 20 minutes at 70° C. in an aqueous solution containing 1 g/liter of ethylene oxide (15 mols)/nonylphenol (nonionic surfactant), and then dyed at 80° C. for 60 minutes with Diacelliton Fast Blue-B (disperse dye trademark of Mitsubishi Chemical Co. Ltd.) (3% of o.w.f.) The goodsto-liquor ratio was 1 : 50. The dyed filaments were washed with water and dried, and tested for gas-fade inhibition. The results are shown in Table 15.

Table 15

| Examples and Comparative Examples | Additives used | Gas-fade test (grade) |
|---|---|---|
| 102 | No. 2 of Table 1 | 1 – 2 |
| 103 | No. 14 of Table 1 | 1 – 2 |
| 104 | No. 28 of Table 1 | 2 |
| 105 | No. 31 of Table 1 | 1 – 2 |
| 106 | No. 46 of Table 2 | 1 – 2 |
| 107 | No. 53 of Table 2 | 2 – 3 |
| 108 | No. 60 of Table 3 | 2 |
| 109 | No. 70 of Table 4 | 2 |
| Comparative Examples | | |
| 69 | Comparison compound No. 1 | 4 – 5 |
| 70 | Comparison compound No. 7 | 4 – 5 |
| 71 | Comparison compound No. 24 | 4 – 5 |
| Control | not added | 5 |

EXAMPLES 110 TO 121 AND COMPARATIVE EXAMPLES 72 TO 78

Three parts by weight of each of the compounds shown in Table 16 was dissolved in 50 parts of a mixture (1:1) of methyl alcohol and benzene, and 1 part by weight of a nonylphenol/ethylene oxide (9 mols) adduct was added. The mixture as emulsified and dispersed in 50 parts by weight of water with vigorous agitation to form an aqueous dispersion containing 3 percent by weight of the effective ingredient.

A taffeta fabric of cellulose diacetate which had been dyed with Kayalon Fast Blue FN (disperse dye trademark of Nippon Kayaku Kabushiki Kaisha) in a concentration of 3 percent o.w.f. at 80° C. for 60 minutes (the goods-toliquor ratio 1 : 100) was immersed in the above aqueous dispersion for 70 seconds, and squeezed so that the takeup of the compound of Table 16 as the effective ingredient was 2 percent by weight, followed by heat-treatment for 3 minutes at 170° C. The treated fabrics were tested for gas-fade inhibition together with an untreated fabric. The results are shown in Table 16.

Table 16

| Examples and Comparative | | Gas-fade test |

Table 16-continued

| Examples | Additives used | (grade) |
|---|---|---|
| 110 | No. 3 of Table 1 | 1 – 2 |
| 111 | No. 10 of Table 1 | 1 – 2 |
| 112 | No. 16 of Table 1 | 1 – 2 |
| 113 | No. 28 of Table 1 | 2 |
| 114 | No. 32 of Table 1 | 1 – 2 |
| 115 | No. 43 of Table 2 | 1 – 2 |
| 116 | No. 48 of Table 2 | 2 |
| 117 | No. 56 of Table 3 | 2 |
| 118 | No. 65 of Table 3 | 2 |
| 119 | No. 70 of Table 4 | 2 |
| 120 | No. 79 of Table 5 | 2 |
| 121 | No. 85 of Table 6 | 2 |
| Comparative Examples | | |
| 72 | Comparison compound No. 3 | 2 – 3 |
| 73 | Comparison compound No. 7 | 1 – 2 |
| 74 | Comparison compound No. 15 | 5 |
| 75 | Comparison compound No. 20 | 2 – 3 |
| 76 | Comparison compound No. 23 | 2 – 3 |
| 77 | Comparison compound No. 24 | 2 – 3 |
| 78 | Comparison compound No. 26 | 2 – 3 |
| Control | not added | 5 |

Each of the treated cloths was washed for 30 minutes in water at 40° C. using an aqueous solution of 1 g/liter of lauryl sulfate by a household washer, rinsed with water at 25° C. for 10 minutes, and dried. They were then tested for gas-fade inhibition.

It was found that in Examples 110 to 121, all test pieces showed a gas-fade inhibiting grade of 2 – 3, but in Comparative Nos. 72 to 78, the anti-gas-fade properties were markedly reduced. The results are shown in Table 17.

Table 17

| Run Nos. | Gas fade test (grade) |
|---|---|
| Examples 110 to 121 | less than 2 – 3 |
| Comparative Examples | |
| 72 | 4 – 5 |
| 73 | 4 – 5 |
| 74 | 5 |
| 75 | 5 |
| 76 | 5 |
| 77 | 4 – 5 |
| 78 | 4 – 5 |

What is claimed is:

1. An anti-gas-fade polymer composition which consists essentially of a polymer selected from the group consisting of polyurethanes and cellulose acetates and not more than 10% by weight, based on the polymer, of an inhibitor which is a triazine derivative of the following formula:

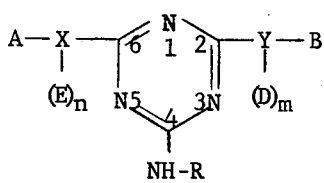

wherein X and Y are the same or different and each represent a member selected from the group consisting of -N<, —S— and —O—, and wherein when X is -N<, n is 1, when X is —S— or —O—, n is zero, when Y is -N<, m is 1, and when Y is —S— or —O—, m is zero; each of A, B and R is a member selected from the group consisting of alkyl groups having 1 to 18 carbon atoms, alkenyl groups having 3 to 18 carbon atoms, cycloalkyl groups having 3 to 6 carbon atoms, a benzyl group, chloro-substituted benzyl groups, cyanoalkyl groups having 3 to 5 carbon atoms, dialkylamino groups having 2 to 8 carbon atoms, a phenylamino group, a phenyl group, and halogen or $C_{1-4}$ alkyl substituted phenyl groups, with the proviso that A, B and R do not represent a phenyl group or substituted phenyl group at the same time, and that when each of X and Y is —S— or —O—, R is not a phenyl group or substituted phenyl group; each of D and E is a member selected from the group consisting of a hydrogen atom and the same groups as represented by A, B and R, A and E or B and D may together form a morpholino, piperazino, or piperidino group together with X and Y, when both of E and D are groups other than a hydrogen atom, R is not a phenyl group or substituted phenyl group, when only E is a hydrogen atom, both A and R are not phenyl groups or substituted phenyl groups, and when only D is a hydrogen atom, both B and R are not phenyl groups or substituted phenyl groups; and the sum of the number of carbon atoms contained in A, B, D, E and R is at least 10.

2. The composition of claim 1 wherein said composition is in the form of a filament, fiber, tow, yarn, knitted fabric, woven fabric, non-woven fabric, film, sheet, powder, granule, pellet, or flake chip.

3. The composition of claim 1 wherein said triazine derivative is incorporated into said polyurethane before or during the polymerization of forming the polyurethane.

4. The composition of claim 1 wherein said triazine derivative is incorporated in said cellulose acetate at any stage before or after the fabrication of the cellulose acetate.

5. The composition of claim 1 wherein the amount of the triazine derivative is 0.1 to 10 percent by weight based on the weight of the polymer.

6. The composition of claim 1 wherein said triazine derivative is incorporated into said polyurethane after polymerization but before fabrication of a finished article.

7. The composition of claim 1 wherein in the triazine derivative Y is -N<.

8. The composition of claim 7 wherein the triazine derivative D is H and B is the same as R.

9. The composition of claim 1 wherein in the triazine derivative the sum of the number of carbon atoms contained in A, B, D, E and R is not more than 50.

10. The composition of claim 9 wherein the sum of the number of carbon atoms is from 12 to 40.

11. The composition of claim 10 wherein the sum of the number of carbon atoms is from 14 to 30.

12. The composition of claim 1 wherein in the triazine derivative A and R are both dialkylamino groups having 2 to 8 carbon atoms, X and Y are both -N<, E is H, D and B are both benzyl groups, and n and m are both 1.

13. A method of inhibiting gas-fade in polyurethanes and cellulose acetates, comprising incorporating not more than 10% by weight of an inhibitor at any time from the preparation of the polyurethanes or cellulose acetates to the final finishing of shaped articles made therefrom, said inhibitor consisting essentially of a triazine derivative expressed by the following formula

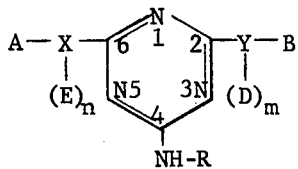

wherein X and Y are the same or different and each represent a member selected from the group consisting of -N<, —S— and —O—, and wherein when X is -N<, n is 1, when X is —S— or —O—, n is zero, when Y is -N<, m is 1, and when Y is —S— or —O—, m is zero; each of A, B and R is a member selected from the group consisting of alkyl groups having 1 to 18 carbon atoms, alkenyl groups having 3 to 18 carbon atoms, cycloalkyl groups having 3 to 6 carbon atoms, a benzyl group, chloro-substituted benzyl groups, cyanoalkyl groups having 3 to 5 carbon atoms, dialkylamino groups having 2 to 8 carbon atoms, a phenylamino group, a phenyl group, and halogen or $C_{1-4}$ alkyl substituted phenyl groups, with the proviso that A, B and R do not represent a phenyl group or substituted phenyl group at the same time, and that when each of X and Y is —S— or —O—, R is not a phenyl group or substituted phenyl group; each of D and E is a member selected from the group consisting of a hydrogen atom and the same groups as represented by A, B and R, A and E or B and D may together form a morpholino, piperazino, or piperidino group together with X and Y, when both of E and D are groups other than a hydrogen atom, R is not a phenyl group or substituted phenyl group, when only E is a hydrogen atom, both A and R are not phenyl groups or substituted phenyl groups, and when only D is a hydrogen atom, both B and R are not phenyl groups or substituted phenyl groups; and the sum of the number of carbon atoms contained in A, B, D, E and R is at least 10.

14. The inhibitor of claim 13 wherein Y is -N<.

15. The inhibitor of claim 14 wherein D is H and B is the same as R.

16. The inhibitor of claim 13 wherein the sum of the number of carbon atoms contained in A, B, D, E and R is not more than 50.

17. The inhibitor of claim 16 wherein the sum of the number of carbon atoms contained in A, B, D, E and R is from 12 to 40.

18. The inhibitor of claim 17 wherein the sum of the number of carbon atoms contained in A, B, D, E and R is from 14 to 30.

19. The inhibitor of claim 13 wherein A and R are both dialkylamino groups having 2 to 8 carbon atoms, X and Y are both -N<, E is H, D and B are both benzyl groups, and n and m are both 1.

* * * * *